(12) United States Patent
Caruso et al.

(10) Patent No.: US 10,337,490 B2
(45) Date of Patent: Jul. 2, 2019

(54) STRUCTURAL COMPONENT FOR A MODULAR ROTOR BLADE

(71) Applicant: General Electric Company, Schenectady, NY (US)

(72) Inventors: Christopher Daniel Caruso, Greenville, SC (US); Aaron A. Yarbrough, Clemson, SC (US); Daniel Alan Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 297 days.

(21) Appl. No.: 14/753,150

(22) Filed: Jun. 29, 2015

(65) Prior Publication Data
US 2016/0377051 A1    Dec. 29, 2016

(51) Int. Cl.
*F03D 1/06* (2006.01)
*F03D 13/10* (2016.01)
*B29D 99/00* (2010.01)
B29K 101/12 (2006.01)
B29K 101/10 (2006.01)

(52) U.S. Cl.
CPC ....... *F03D 1/0675* (2013.01); *B29D 99/0025* (2013.01); *F03D 13/10* (2016.05); *B29K 2101/10* (2013.01); *B29K 2101/12* (2013.01); *F05B 2230/50* (2013.01);
(Continued)

(58) Field of Classification Search
None
See application file for complete search history.

(56) References Cited

U.S. PATENT DOCUMENTS 2,884,078 A    4/1959  Stamm et al.
4,329,119 A    5/1982  Baskin
(Continued)

FOREIGN PATENT DOCUMENTS

AU    2011304537 B2    3/2012
CA    2517951 A1    9/2004
(Continued)

OTHER PUBLICATIONS

European Search Report and Opinion issued in connection with corresponding European Application No. 16176516.9 dated Nov. 23, 2016.
(Continued)

*Primary Examiner* — Christopher Verdier
*Assistant Examiner* — Jason G Davis
(74) *Attorney, Agent, or Firm* — Dority & Manning, P.A.

(57) ABSTRACT

The present disclosure is directed to a pre-formed, continuous structural component for use in assembling a modular rotor blade for a wind turbine. Further, the structural component provides support to the modular rotor blade during operation. The pre-formed structural component includes a root portion and a body portion. The root portion is configured for mounting the structural component to a blade root section of the rotor blade. The body portion is configured to extend in a generally span-wise direction. Further, the body portion defines a predetermined cross-section having a flat-back portion with a first end and a second end. In addition, the first and second ends each have a flange extending perpendicularly therefrom. Thus, each flange defines a mounting surface for one or more blade segments.

14 Claims, 12 Drawing Sheets

(52) U.S. Cl.
CPC ..... *F05B 2230/60* (2013.01); *F05B 2240/302* (2013.01); *Y02E 10/721* (2013.01); *Y02P 70/523* (2015.11)

(56) References Cited

U.S. PATENT DOCUMENTS

| | | | |
|---|---|---|---|
| 4,474,536 A | | 10/1984 | Gougeon et al. |
| 5,476,704 A | | 12/1995 | Köhler |
| 6,264,877 B1 | | 7/2001 | Pallu De La Barriere |
| 7,473,385 B2 | | 1/2009 | Stiesdal et al. |
| 7,503,752 B2 | | 3/2009 | Gunneskov et al. |
| 7,625,185 B2 | | 12/2009 | Wobben |
| 7,637,721 B2 | | 12/2009 | Driver et al. |
| 7,654,799 B2 | | 2/2010 | Eyb |
| 7,854,594 B2 | | 12/2010 | Judge |
| 7,922,454 B1 | | 4/2011 | Riddell |
| 8,043,065 B2 | * | 10/2011 | Kyriakides ............ F03D 1/0675 416/223 R |
| 8,057,189 B2 | | 11/2011 | Riahi |
| 8,079,818 B2 | | 12/2011 | Burchardt et al. |
| 8,114,329 B2 | | 2/2012 | Karem |
| 8,142,162 B2 | | 3/2012 | Godsk et al. |
| 8,147,209 B2 | | 4/2012 | Godsk et al. |
| 8,168,027 B2 | | 5/2012 | Jacobsen et al. |
| 8,172,538 B2 | | 5/2012 | Hancock et al. |
| 8,262,361 B2 | | 9/2012 | Sanz Pascual et al. |
| 8,297,932 B2 | | 10/2012 | Arocena De La Rua et al. |
| 8,297,933 B2 | | 10/2012 | Riahi |
| 8,317,479 B2 | | 11/2012 | Vronsky et al. |
| 8,348,622 B2 | | 1/2013 | Bech |
| 8,353,674 B2 | | 1/2013 | Bech |
| 8,455,090 B2 | | 6/2013 | Schmidt et al. |
| 8,506,258 B2 | | 8/2013 | Baker et al. |
| 8,511,996 B2 | | 8/2013 | Llorente Gonzalez et al. |
| 8,517,689 B2 | | 8/2013 | Kyriakides et al. |
| 8,540,491 B2 | | 9/2013 | Gruhn et al. |
| 8,545,744 B2 | | 10/2013 | Jones |
| 8,580,060 B2 | | 11/2013 | Bech |
| 8,657,581 B2 | | 2/2014 | Pilpel et al. |
| 8,673,106 B1 | | 3/2014 | Jolley et al. |
| 8,696,317 B2 | | 4/2014 | Rudling |
| 8,747,098 B1 | | 6/2014 | Johnson et al. |
| 8,764,401 B2 | | 7/2014 | Hayden et al. |
| 8,826,534 B2 | | 9/2014 | Cappelli et al. |
| 8,827,655 B2 | | 9/2014 | Bech |
| 8,894,374 B2 | | 11/2014 | Fuglsang et al. |
| 8,918,997 B2 | | 12/2014 | Kyriakides et al. |
| 8,961,142 B2 | | 2/2015 | Wansink |
| 8,992,813 B2 | | 3/2015 | Robbins et al. |
| 2007/0036659 A1 | | 2/2007 | Hibbard |
| 2009/0148300 A1 | | 6/2009 | Driver et al. |
| 2010/0098549 A1 | | 4/2010 | Mironov |
| 2010/0303631 A1 | * | 12/2010 | Payne ................ F03D 1/0675 416/226 |
| 2011/0031758 A1 | | 2/2011 | Mitsuoka et al. |
| 2011/0037191 A1 | | 2/2011 | Stiesdal |
| 2011/0045276 A1 | | 2/2011 | Grove-Nielsen |
| 2011/0081248 A1 | * | 4/2011 | Hibbard ............... F03D 1/0675 416/226 |
| 2011/0103962 A1 | | 5/2011 | Hayden et al. |
| 2011/0114252 A1 | | 5/2011 | Partington et al. |
| 2011/0142662 A1 | | 6/2011 | Fritz et al. |
| 2011/0142670 A1 | * | 6/2011 | Pilpel .................... F03D 3/062 416/230 |
| 2011/0206529 A1 | * | 8/2011 | Bell .................... B29C 65/48 416/226 |
| 2011/0318186 A1 | | 12/2011 | Kristensen et al. |
| 2012/0034096 A1 | | 2/2012 | Appleton |
| 2012/0039720 A1 | | 2/2012 | Bech |
| 2012/0180582 A1 | | 7/2012 | Piasecki |
| 2012/0183408 A1 | | 7/2012 | Noerlem |
| 2012/0230830 A1 | | 9/2012 | Lind et al. |
| 2012/0237356 A1 | | 9/2012 | Mironov |
| 2012/0257984 A1 | | 10/2012 | Frederiksen |
| 2013/0012086 A1 | | 1/2013 | Jones et al. |
| 2013/0022466 A1 | | 1/2013 | Laurberg |
| 2013/0108453 A1 | | 5/2013 | Baker et al. |
| 2013/0149166 A1 | | 6/2013 | Schibsbye |
| 2013/0164133 A1 | | 6/2013 | Grove-Nielsen |
| 2013/0195661 A1 | | 8/2013 | Lind et al. |
| 2013/0231018 A1 | | 9/2013 | Kruger et al. |
| 2013/0333823 A1 | | 12/2013 | Hedges et al. |
| 2014/0003955 A1 | | 1/2014 | Richter |
| 2014/0003956 A1 | | 1/2014 | Lull et al. |
| 2014/0023513 A1 | | 1/2014 | Johnson et al. |
| 2014/0030094 A1 | | 1/2014 | Dahl et al. |
| 2014/0119936 A1 | | 5/2014 | Dahl et al. |
| 2014/0140855 A1 | | 5/2014 | Arendt et al. |
| 2014/0271217 A1 | * | 9/2014 | Baker .................. F03D 1/0633 416/226 |
| 2014/0295187 A1 | | 10/2014 | Jacobsen et al. |
| 2014/0348659 A1 | | 11/2014 | Stewart |
| 2015/0003991 A1 | | 1/2015 | Bagepalli et al. |
| 2015/0224760 A1 | | 8/2015 | Eyb et al. |
| 2015/0316023 A1 | * | 11/2015 | Sandercock ....... B29D 99/0028 416/229 A |
| 2015/0316028 A1 | * | 11/2015 | Brekenfeld ........... F03D 1/0675 416/229 R |

FOREIGN PATENT DOCUMENTS

| | | |
|---|---|---|
| CA | 2526407 | 12/2004 |
| CN | 201155423 Y | 11/2008 |
| CN | 100476200 C | 4/2009 |
| CN | 101302302 B | 2/2011 |
| CN | 102705157 A | 10/2012 |
| CN | 101906251 B | 6/2013 |
| DE | 102011051172 A1 | 12/2012 |
| DE | 102012019351 A1 | 4/2014 |
| DK | 201270816 A | 1/2014 |
| DK | 201270818 A | 1/2014 |
| EP | 2113373 B1 | 1/2011 |
| EP | 2255957 B1 | 7/2013 |
| EP | 2617558 A1 | 7/2013 |
| EP | 2679804 A1 | 1/2014 |
| EP | 2679806 A1 | 1/2014 |
| EP | 2682256 A1 | 1/2014 |
| EP | 2687557 A1 | 1/2014 |
| EP | 2455419 B1 | 3/2014 |
| EP | 1808598 B1 | 4/2014 |
| EP | 2752577 A2 | 7/2014 |
| GB | 2451192 A | 1/2009 |
| GB | 2455044 A | 6/2009 |
| GB | 2464539 A | 4/2010 |
| GB | 2485453 A | 5/2012 |
| GB | 2520007 A | 5/2015 |
| JP | 2002137307 A | 5/2002 |
| JP | 2007092716 A | 4/2007 |
| JP | 3930200 B2 | 6/2007 |
| JP | 2009235306 A | 10/2009 |
| JP | 2014015567 A | 1/2014 |
| JP | 5439412 B2 | 3/2014 |
| WO | W003082551 A1 | 10/2003 |
| WO | WO 2007/051465 A1 | 5/2007 |
| WO | WO 2008/086805 A2 | 7/2008 |
| WO | WO 2009/118545 A1 | 10/2009 |
| WO | WO 2010/025830 A2 | 3/2010 |
| WO | WO 2010/057502 A2 | 5/2010 |
| WO | WO 2010/083921 A2 | 7/2010 |
| WO | 2011088834 A2 | 7/2011 |
| WO | WO 2011/088835 A2 | 7/2011 |
| WO | WO 2011/098785 A2 | 8/2011 |
| WO | WO 2011/113812 A1 | 9/2011 |
| WO | WO 2012/010293 A1 | 1/2012 |
| WO | WO 2012/042261 A1 | 4/2012 |
| WO | WO 2012/140039 A2 | 10/2012 |
| WO | WO 2012/161741 A2 | 11/2012 |
| WO | WO 2013/007351 A1 | 1/2013 |
| WO | WO 2013/060582 A1 | 5/2013 |
| WO | WO 2013/087078 A1 | 6/2013 |
| WO | WO 2013/091639 A2 | 6/2013 |
| WO | WO 2013/178228 A1 | 12/2013 |
| WO | WO 2014/001537 A1 | 1/2014 |
| WO | WO 2014/044280 A1 | 3/2014 |

(56) References Cited

FOREIGN PATENT DOCUMENTS

| WO | WO 2014/063944 A1 | 5/2014 |
| WO | WO 2014/079456 A1 | 5/2014 |
| WO | WO 2014/079565 A2 | 5/2014 |
| WO | WO 2015/015202 A1 | 5/2014 |

OTHER PUBLICATIONS

Co pending U.S. Appl. No. 14/188,356, filed Feb. 25, 2014.

* cited by examiner

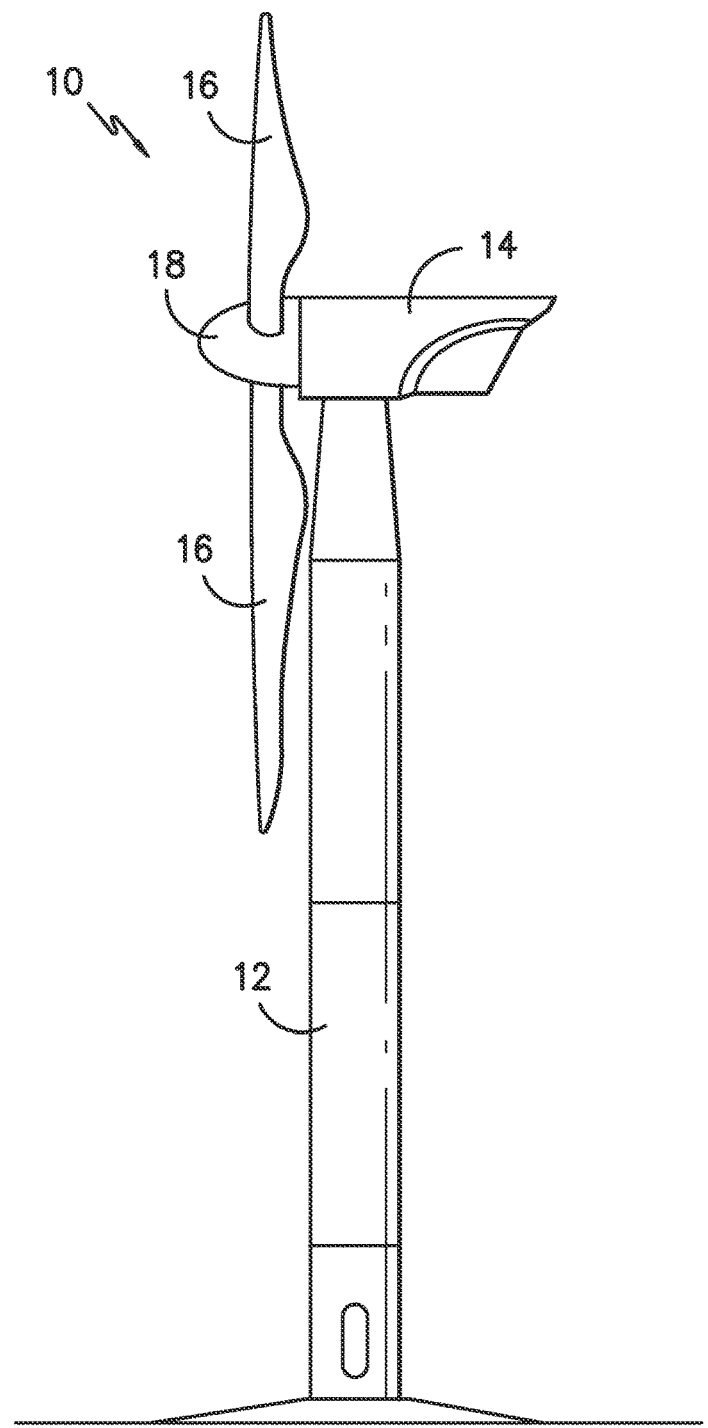
FIG. -1-

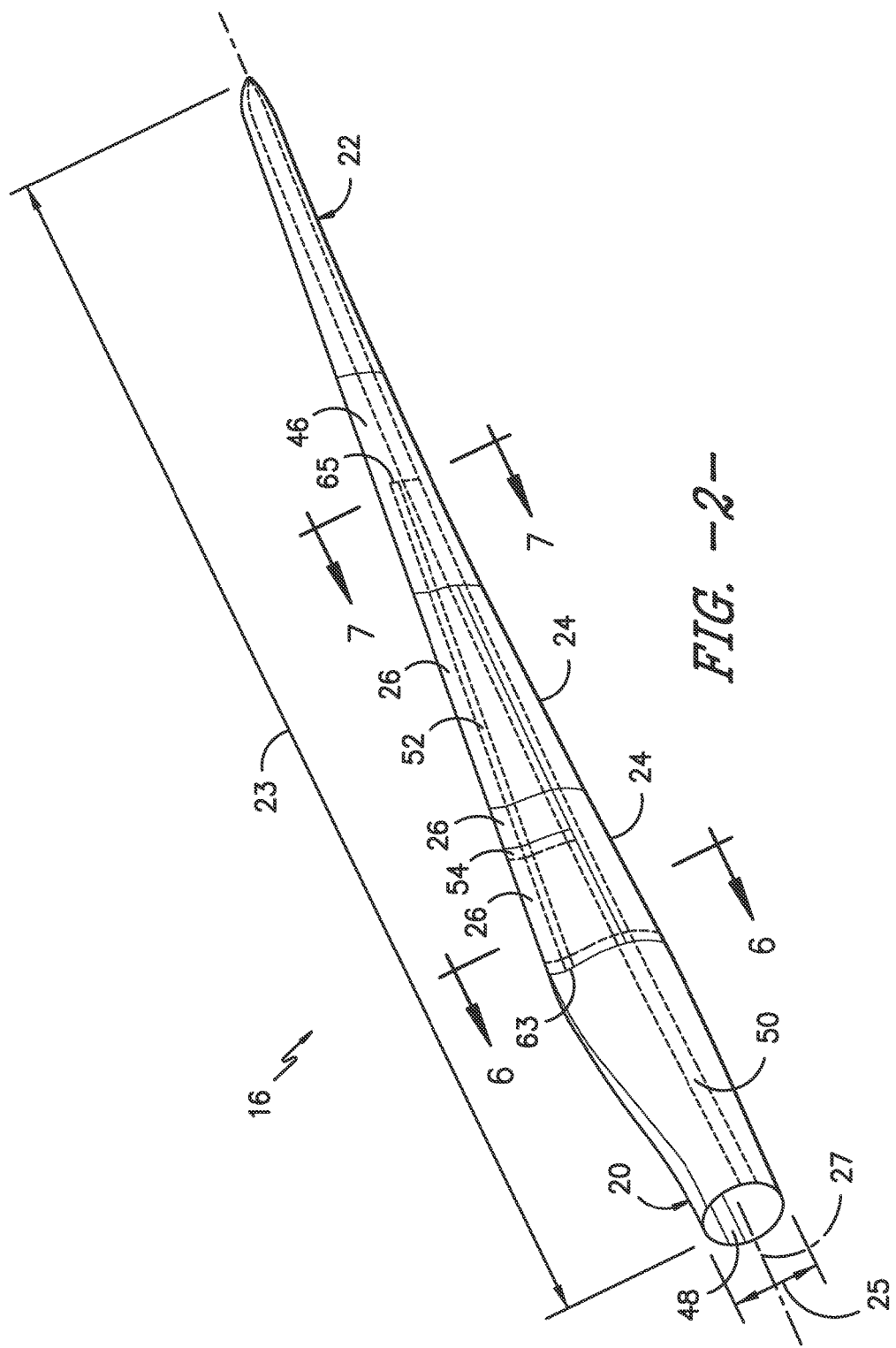
FIG. -2-

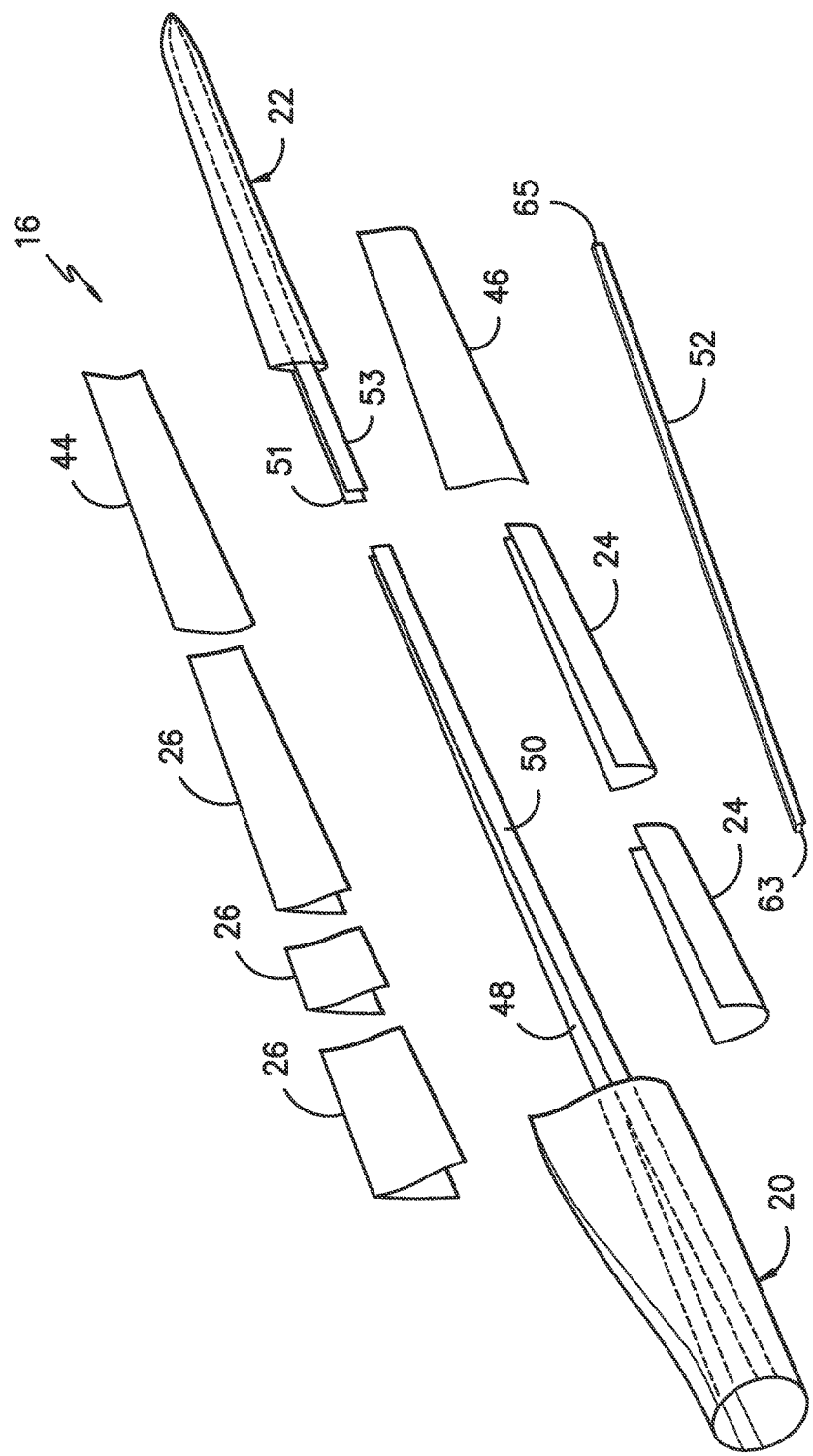
FIG. -3-

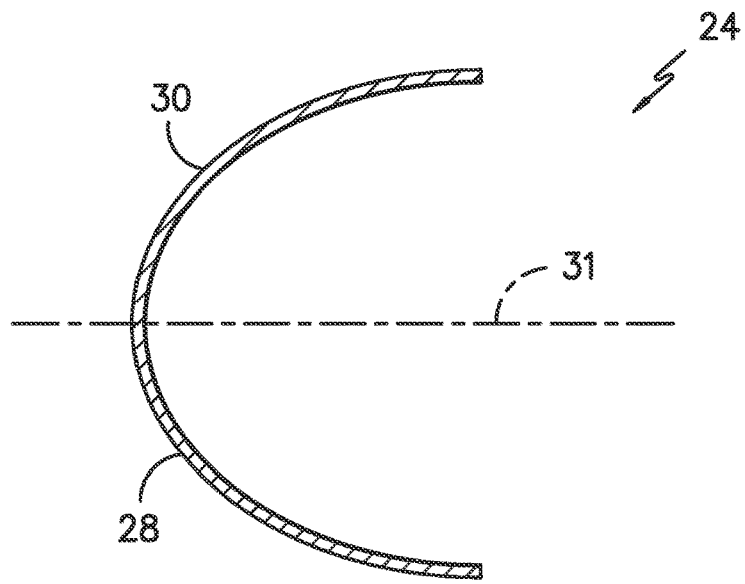
FIG. -4-
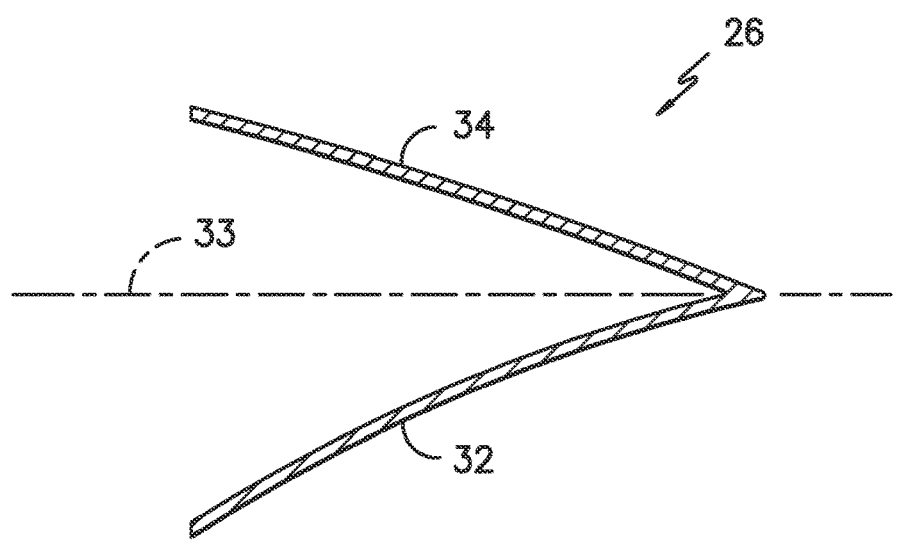
FIG. -5-

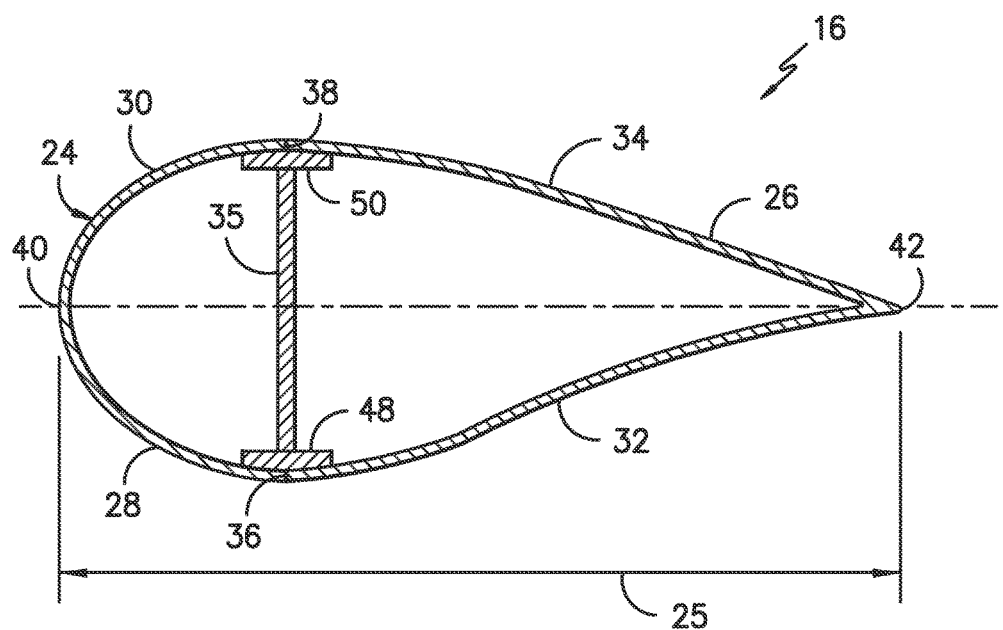
FIG. -6-
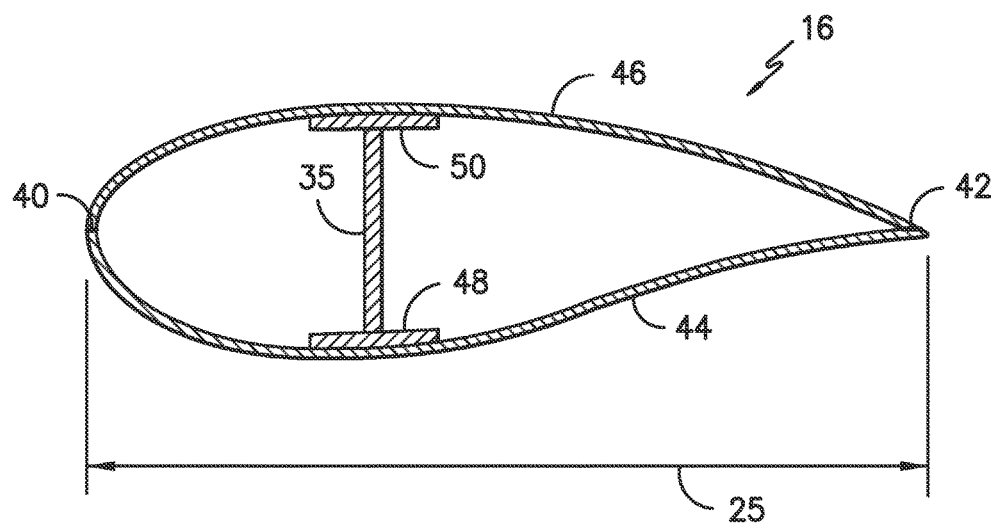
FIG. -7-

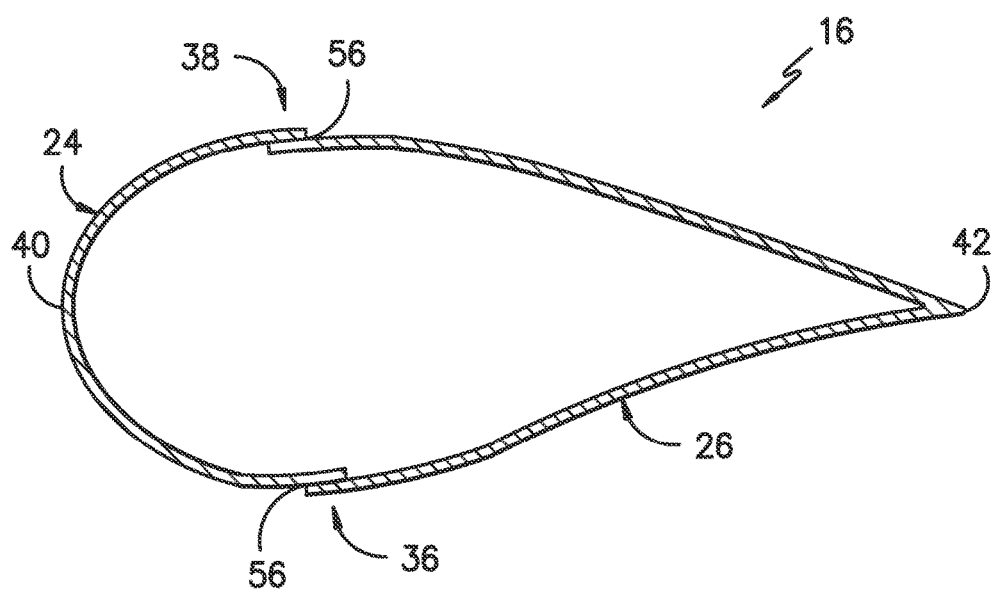
FIG. -8-
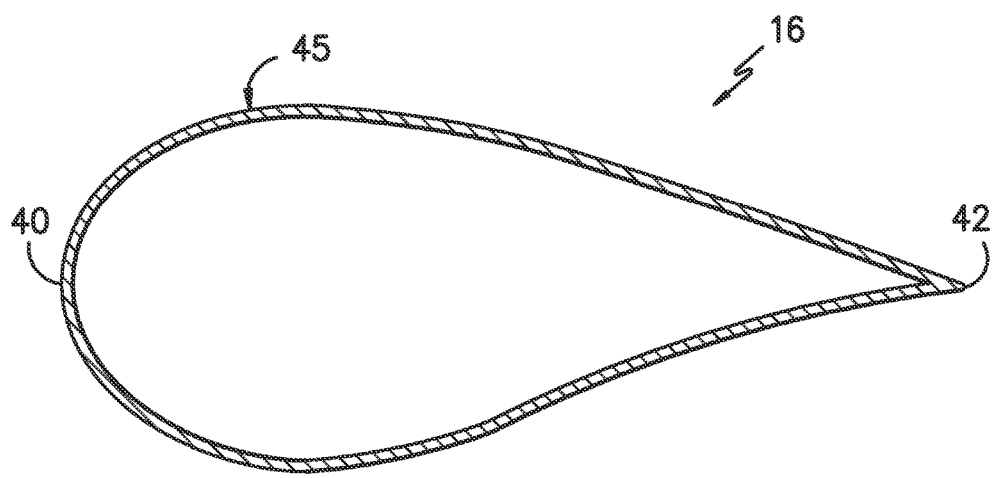
FIG. -9-

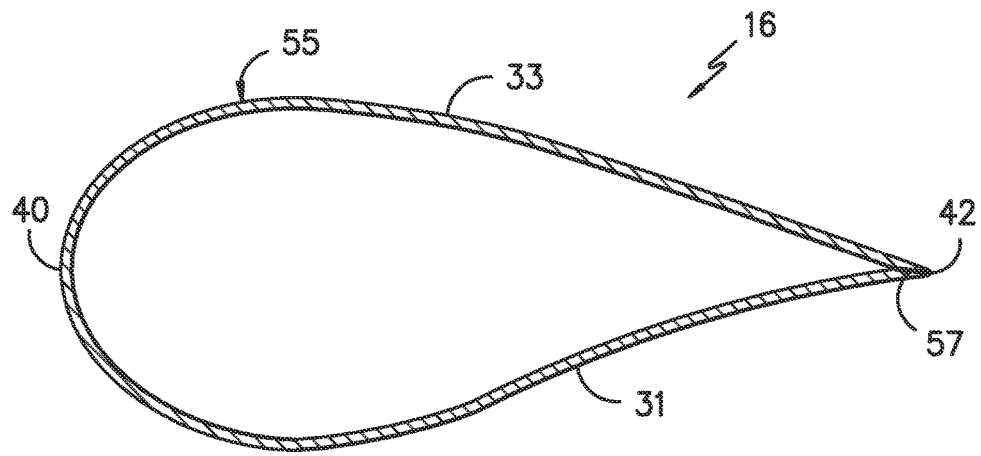
FIG. -10-
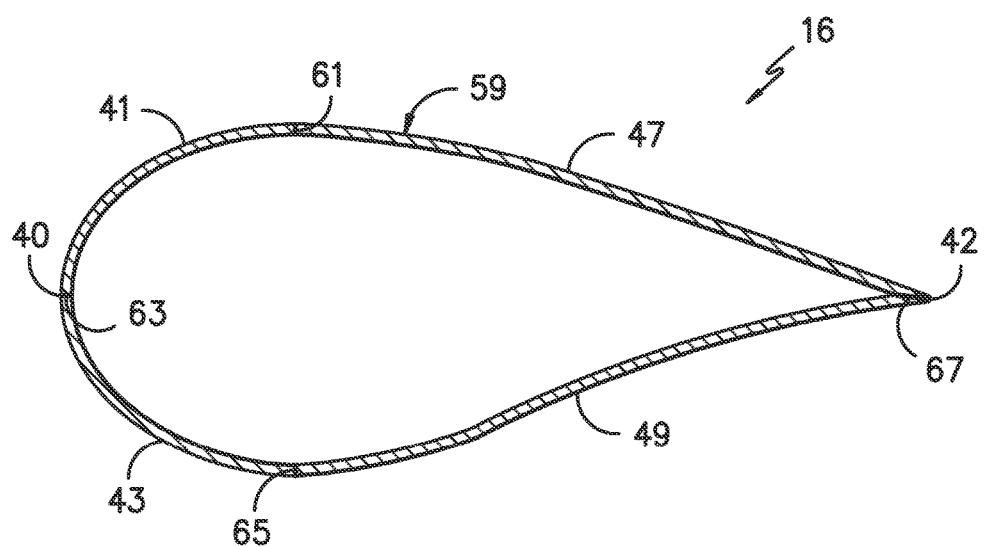
FIG. -11-

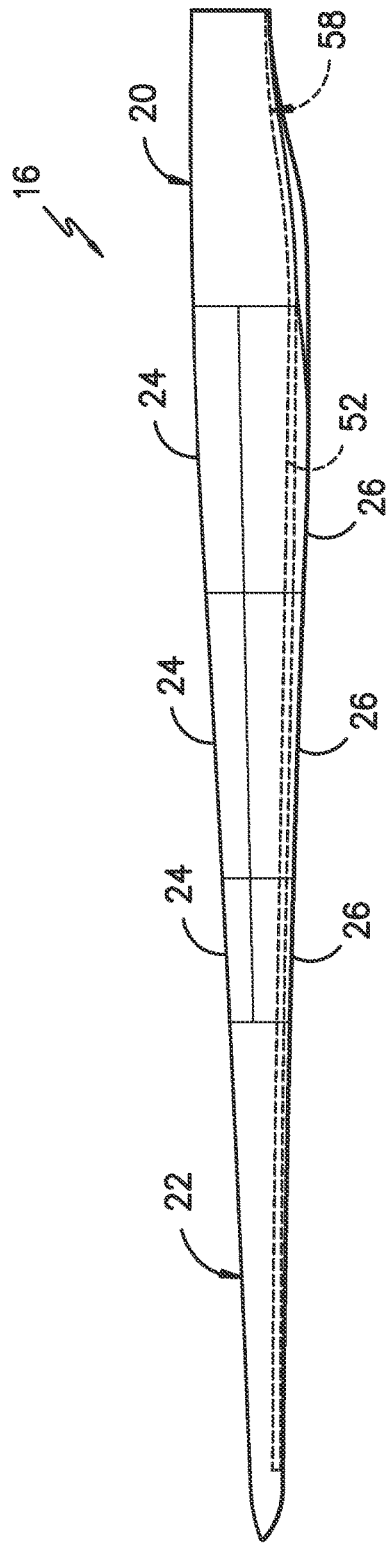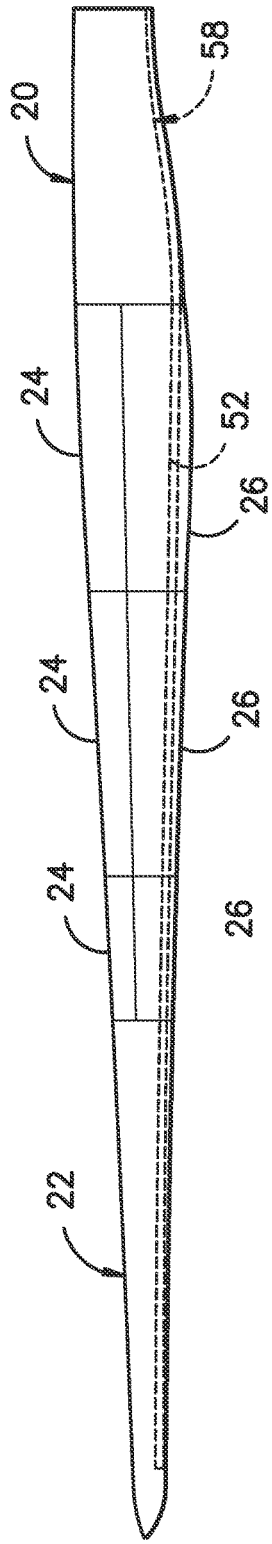

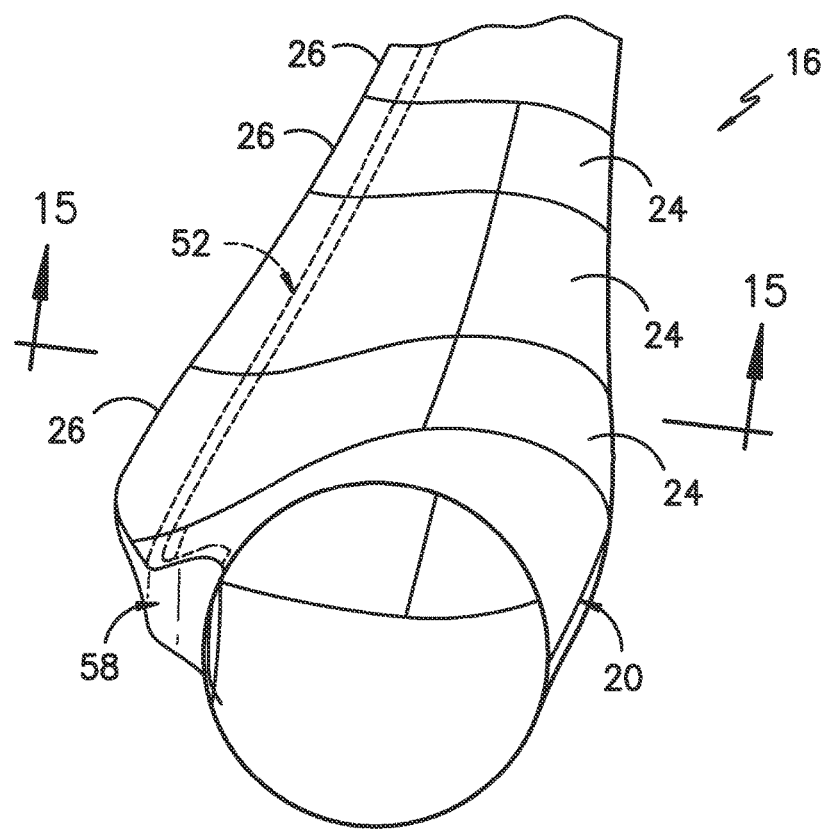
FIG. -14-
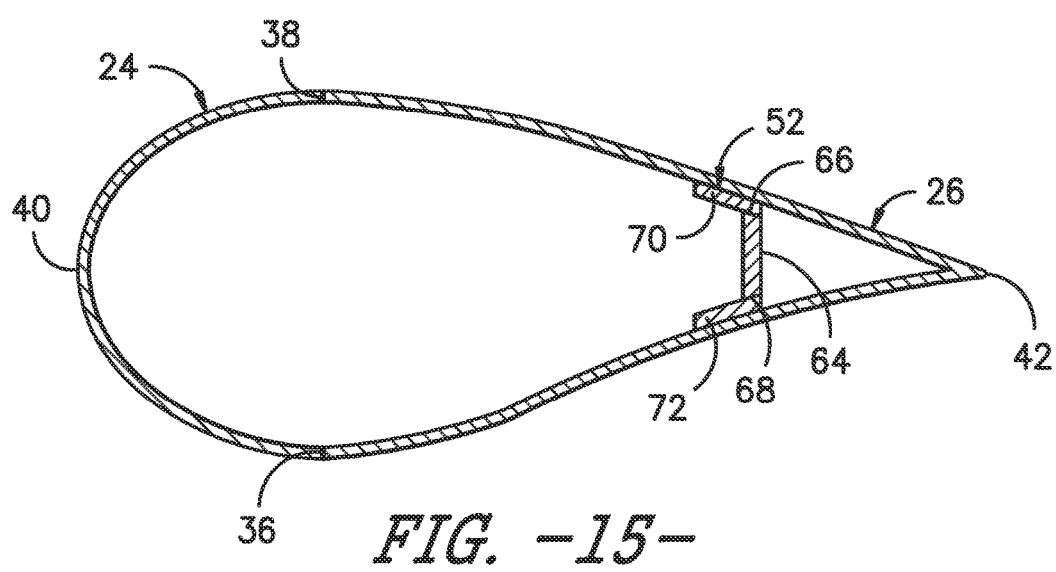
FIG. -15-

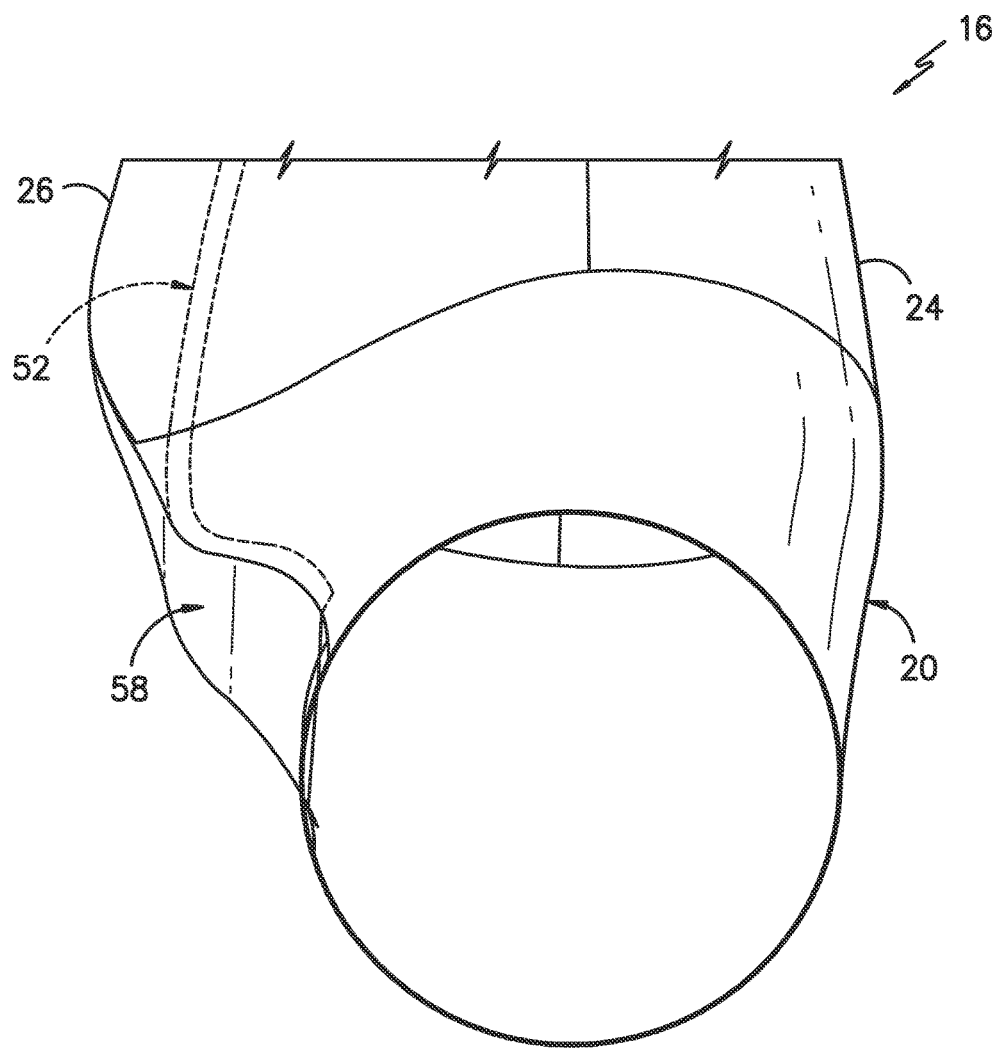
FIG. -16-

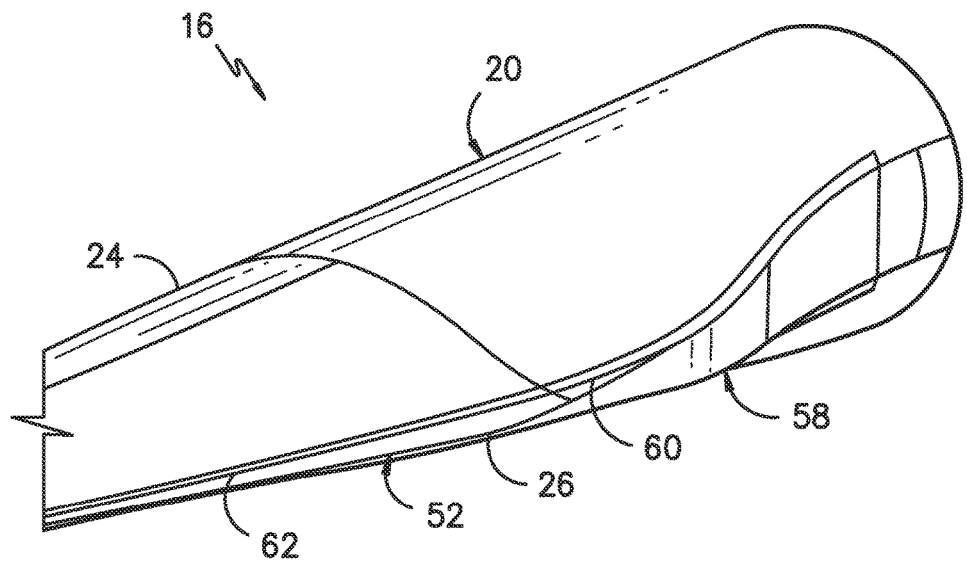
FIG. -17-
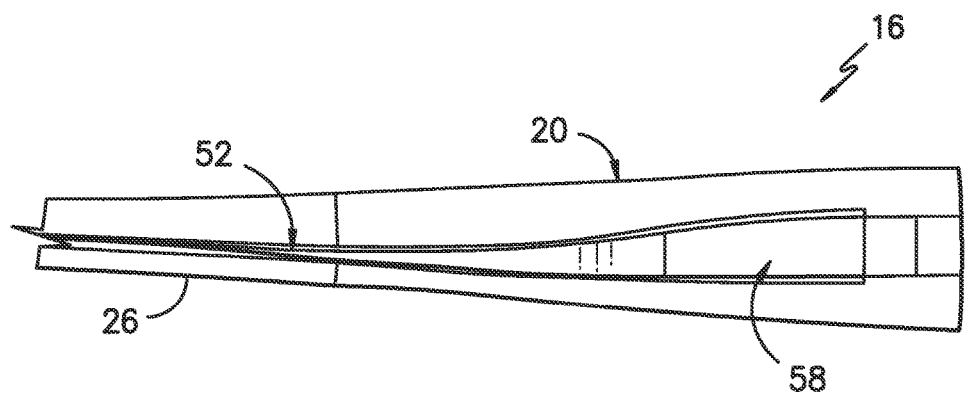
FIG. -18-

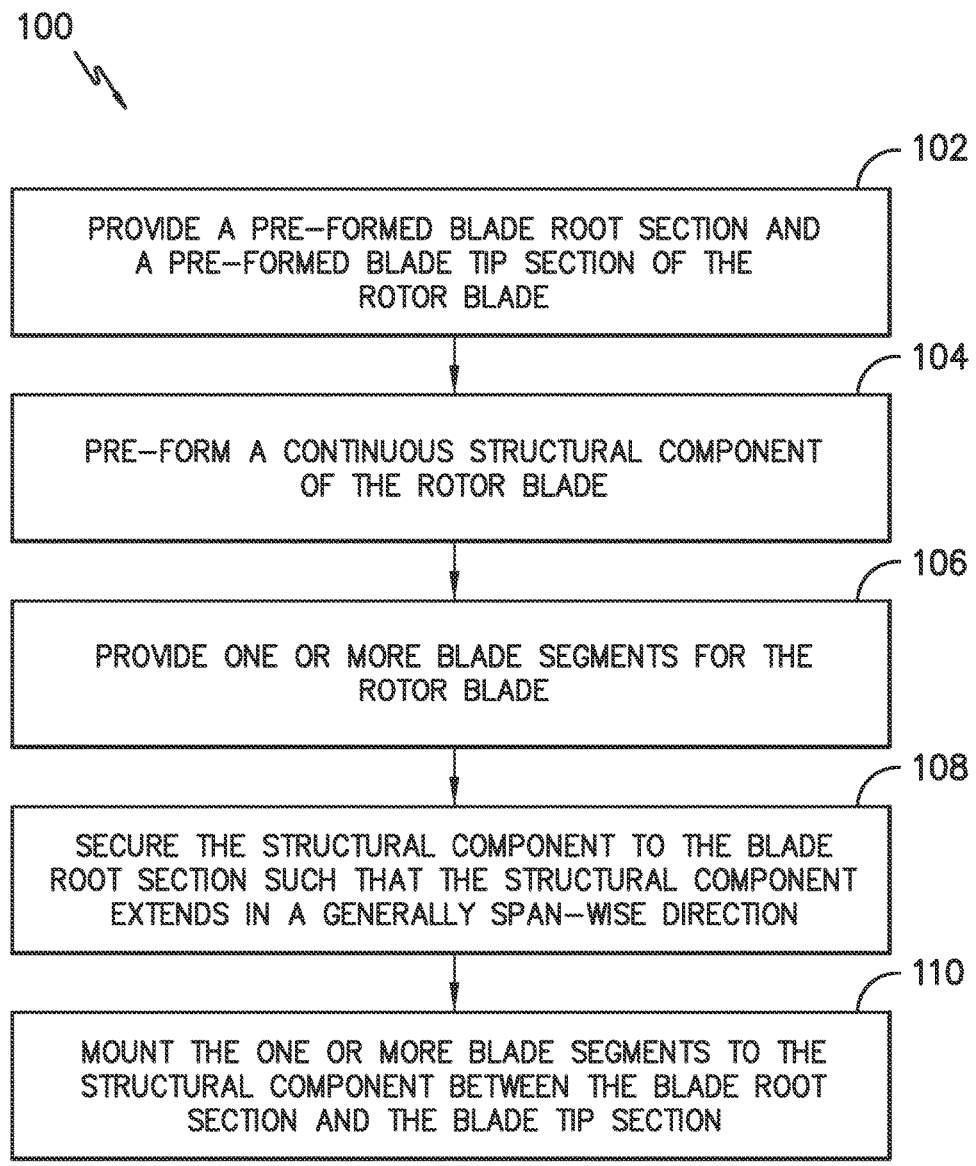

STRUCTURAL COMPONENT FOR A MODULAR ROTOR BLADE

FIELD OF THE INVENTION

The present disclosure relates generally to wind turbine rotor blades, and more particularly to a flatback structural component for modular wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps may be constructed of various materials, including but not limited to glass fiber laminate composites and/or carbon fiber laminate composites.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

In addition, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade after, for example, the individual blade segments are transported to the field. However, known joint designs for connecting the blade segments together typically have a variety of disadvantages. For example, many known joint designs do not provide for sufficient alignment of the blade segments. As such, a significant amount of time is wasted in aligning the blade segments for assembly of the rotor blade. Additionally, many known joint designs include various complex interconnecting components (e.g. scarf joints), thereby increasing the amount of time needed to assemble the blade segments. In addition, segmented blades are typically heavier than blades manufactured using conventional methods due to the additional joints and/or related parts. Further, each of the segments is still manufactured using blade halves that are bonded together at leading and trailing edges, which as mentioned, is a critical design constraint.

Thus, the art is continuously seeking new and improved rotor blades and related methods that address the aforementioned issues. Accordingly, the present disclosure is directed to improved modular wind turbine rotor blades that are assembled via a flatback structural component.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a modular rotor blade for a wind turbine. The rotor blade includes a pre-formed blade root section having one or more spar caps extending in a generally span-wise direction, a pre-formed blade tip section, a pre-formed structural component secured to the blade root section and extending in the span-wise direction, and a plurality of blade segments. Further, the blade segments are arranged between the blade root section and the blade tip section. Thus, the pre-formed structural component may be an internal feature configured to provide structural support to the modular rotor blade. In addition, the pre-formed structural component may be an external feature that forms a flatback cross-sectional shape of the airfoil.

In one embodiment, the pre-formed structural component may be secured to a corresponding structural component of the blade root section. More specifically, in certain embodiments, the structural component may further include a root portion and a body portion. Thus, in particular embodiments, the root portion may be secured to the corresponding structural component of the blade root section, e.g. via a scarf joint. In another embodiment, the corresponding structural component of the blade root section may have a cross-section that varies with a cross-sectional shape of the blade root section. In certain embodiments, the structural component may be configured at a location of within 50% chord from a trailing edge of the rotor blade.

In additional embodiments, the structural component may be constructed of one or more pultruded parts. Thus, in certain embodiments, the structural component may have a constant cross-section from a root to a tip of the structural component. In alternative embodiments, the structural component may have a varying cross-section along a length thereof. For example, in particular embodiments, the cross-section of the structural component may include a flatback portion having a first end and a second end. In addition, the first and second ends may each include a flange extending perpendicularly therefrom. Thus, the flanges provide a mounting surface for the blade segment(s) described herein.

In yet another embodiment, the structural component may be constructed of any suitable materials, including but not limited to thermoset polymer, a thermoplastic polymer, or similar.

In additional embodiment, the blade segment(s) as described herein may include leading or trailing edge segments, pressure or suction side segments, non-jointed, continuous blade segments, single-jointed blade segments, forward pressure side segments, forward suction side segments, aft pressure side segments, aft suction side segments, or similar or any combinations thereof.

In yet another embodiment, the blade root section and/or the blade tip section may include one or more spar caps extending therefrom. Thus, in certain embodiments, the blade root section and the blade tip section may be joined together via their respective spar cap(s).

In another aspect, the present disclosure is directed to a pre-formed structural component for use in assembling a modular rotor blade for a wind turbine. The pre-formed structural component includes a root portion configured for mounting to a blade root section of the rotor blade and a body portion configured to extend in a generally span-wise direction. Further, the body portion defines a cross-section having a flatback portion with a first end and a second end. In addition, the first and second ends each have a flange extending perpendicularly therefrom. Thus, each flange defines a mounting surface for one or more blade segments.

In yet another aspect, the present disclosure is directed to a method for assembling a modular rotor blade for a wind turbine. The method includes providing a pre-formed blade root section and a pre-formed blade tip section for the rotor blade. Another step includes pre-forming a continuous structural component of the rotor blade. The method also includes providing one or more pre-formed blade segments of the rotor blade. A further step includes securing the structural component to the blade root section such that the structural component extends in a generally span-wise direction. Thus, the method also includes mounting the one or more blade segments to the structural component between the blade root section and the blade tip section.

In one embodiment, the blade segment(s) may include at least one leading edge segment and at least one trailing edge segment. In such embodiments, the method may also include mounting one or more trailing edge segments to the structural component between the blade root section and the blade tip section in a generally span-wise direction, and securing one or more leading edge segments to the mounted trailing edge segment at a pressure side seam and a suction side seam such that the structural component is within the one or more leading and trailing edge segments. In alternative embodiments, the method may include mounting one or more blade segments to the structural component between the blade root section and the blade tip section in a generally span-wise direction such that the structural component is external to the one or more blade segments. The blade segment(s) described herein may also include pressure or suction side segments, a non-jointed, continuous blade segment, a single-jointed blade segment, a forward pressure side segment, a forward suction side segment, an aft pressure side segment, an aft suction side segment, or similar or any combinations thereof.

In another embodiment, the method may also include securing the pre-formed continuous structural component to a corresponding structural component of the blade root section. Further, in particular embodiments, the method may further include securing a root portion of the pre-formed structural component to the corresponding structural component of the blade root section, e.g. via a scarf joint. In particular embodiments, the method may also include pre-forming the corresponding structural component of the blade root section so as to have a cross-section that varies with a cross-sectional shape of the blade root section.

In additional embodiments, the step of pre-forming the structural component may include utilizing at least one of pultrusion, vacuum infusion, resin transfer molding (RTM), light resin transfer molding (RTM), vacuum assisted resin transfer molding (VARTM), a forming process (e.g. thermoforming), or similar. For example, in certain embodiments, the pultruded structural component may have a cross-section that varies along a length thereof (e.g. from a root to a tip of the structural component). Alternatively, the cross-section may be constant along a length thereof. More specifically, the cross-section may include a flatback portion with a first end and a second end. Further, the first and second ends may each include a flange extending perpendicularly therefrom. Thus, the flanges are configured to provide a mounting surface for the various blade components, e.g. the blade segments. Accordingly, in certain embodiments, the method may also include mounting the one or more blade segments to the flanges of the structural component.

In still further embodiments, the method may also include co-infusing one or more spar caps with at least one of the blade root section or the blade tip section. In such an embodiment, the method may further include joining the blade root section and the blade tip section via their respective spar caps.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a modular rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 along line 6-6;

FIG. 7 illustrates a cross-sectional view of the modular rotor blade of FIG. 2 along line 7-7;

FIG. 8 illustrates a cross-sectional view of another embodiment of a modular rotor blade according to the present disclosure, particularly illustrating overlapping pressure and suction side seams;

FIG. 9 illustrates a cross-sectional view of another embodiment of a modular rotor blade according to the present disclosure, particularly illustrating a non-jointed, continuous blade segment;

FIG. 10 illustrates a cross-sectional view of another embodiment of a modular rotor blade according to the present disclosure, particularly illustrating a single-jointed blade segment;

FIG. 11 illustrates a cross-sectional view of another embodiment of a modular rotor blade according to the present disclosure, particularly illustrating a plurality of blade segments joined together via multiple joints;

FIG. 12 illustrates a side view of one embodiment of a modular rotor blade, particularly illustrating a structural component configured with a corresponding structural component of a blade root section of the rotor blade according to the present disclosure;

FIG. 13 illustrates a side view of another embodiment of a modular rotor blade, particularly illustrating a structural component configured with a blade root section of the rotor blade according to the present disclosure;

FIG. 14 illustrates an end view of one embodiment of a modular rotor blade, particularly illustrating a structural component configured with a corresponding structural component of a blade root section of the rotor blade according to the present disclosure;

FIG. 15 illustrates a cross-sectional view of the modular rotor blade of FIG. 14 along line 15-15;

FIG. 16 illustrates a detailed end view of the embodiment of FIG. 10;

FIG. 17 illustrates a detailed side view of the embodiment of FIG. 10;

FIG. 18 illustrates a detailed side view as viewed from a trailing edge of the rotor blade of the embodiment of FIG. 10; and FIG. 19 illustrates a flow diagram of a method for assembling a modular rotor blade for a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a pre-formed, continuous structural component for use in assembling a modular rotor blade for a wind turbine. The pre-formed structural component includes a root portion that is mounted to a blade root section of the rotor blade and a body portion configured to extend in a generally span-wise direction. Further, the body portion defines a cross-section having a flatback portion with a first end and a second end. In addition, the first and second ends each have a flange extending perpendicularly therefrom so as to define a mounting surface for one or more modular blade segments that form the outer covering of the rotor blade.

Thus, the present disclosure provides many advantages not present in the prior art. For example, the continuous structural component of the present disclosure provides a mounting surface for the blade segments, thereby eliminating the need for complex scarf joints between segments. Further, the flanges on the flatback portion improve buckling resistance in the blade segments. As such, the present disclosure provides improved modular rotor blades that may increase supply chain options, reduce manufacturing cycle time, and/or reduce shipping cost. Thus, the rotor blades and methods of the present disclosure provide an economic alternative to conventional rotor blades. Further, the modular rotor blades of the present disclosure have a reduced weight.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a modular rotor blade 16 manufactured according to the present disclosure are illustrated. As shown, the rotor blade 16 includes a modular configuration having a pre-formed blade root section 20, a pre-formed blade tip section 22 disposed opposite the blade root section 20, and a plurality of blade segments arranged therebetween. The blade root section 20 is configured to be mounted or otherwise secured to the rotor 18 (FIG. 1). Further, as shown in FIG. 2, the rotor blade 16 defines a span 23 that is equal to the total length between the blade root section 20 and the blade tip section 22. In addition, as shown in FIGS. 2 and 6, the rotor blade 16 defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In addition, as shown in the illustrated embodiment, the blade segments generally serve as the outer casing/covering of the rotor blade 16 and may define a substantially aerodynamic profile, such as by defining a symmetrical or cambered airfoil-shaped cross-section. Further, as shown, the blade segment(s) may include a plurality of leading edge segments 24 and a plurality of trailing edge segments 26 generally arranged between the blade root section 20 and the blade tip section 22 along a longitudinal axis 27 in a generally span-wise direction. In additional embodiments, it should be understood that the blade segment portion of the blade 16 may include any combination of the segments described herein and are not limited to the embodiment as depicted.

Referring now to FIG. 4, each of the leading edge segments 24 has a forward pressure side surface 28 and a forward suction side surface 30. Similarly, as shown in FIG. 5, each of the trailing edge segments 26 has an aft pressure side surface 32 and an aft suction side surface 34. In addition, as particularly shown in FIG. 6, the leading edge segment(s) 26 and the trailing edge segment(s) 26 may be joined at a pressure side seam 36 and a suction side seam 38. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

In further embodiments, as shown in FIG. 8, the leading edge segment(s) 24 and the trailing edge segment(s) 26 may be configured to overlap at the pressure side seam 36 and/or the suction side seam 38. In addition, as shown in FIG. 2, adjacent leading edge segments 24 as well as adjacent trailing edge segments 26 may be configured to overlap at a seam 54. More specifically, in certain embodiments, the various segments of the rotor blade 16 may be further secured together, e.g. via an adhesive 56 configured between the overlapping leading and trailing edge segments 24, 26 and/or the overlapping adjacent leading or trailing edge segments 24, 26.

In addition, the pressure side seam 26 and/or the suction side seam 38 may be located at any suitable chord-wise location. For example, as shown in FIGS. 6 and 8, the seams 36, 38 may be located from about 40% to about 60% chord from the leading edge 40 of the rotor blade 16. More specifically, in certain embodiments, the seams 36, 38 may be located at about 50% chord from the leading edge 40. In still further embodiments, the seams 36, 38 may be located less than 40% chord or greater than 60% chord from the leading edge 40 of the rotor blade 16. In addition, in some embodiments, the seams 36, 38 may be aligned as generally shown in the figures. Alternatively, the seams 36, 38 may be offset.

In additional embodiments, as shown in FIGS. 2-3 and 7, the rotor blade 16 may also include at least one pressure side segment 44 and/or at least one suction side segment 46. For example, as shown in FIG. 7, the rotor blade 16 may include a pressure side segment 44 arranged and joined with a suction side segment 46 at the leading and trailing edges 40, 42. Such segments may be used in combination with and/or exclusive of the additional segments as described herein.

Thus far, the segments described herein are joined at two joint locations. Although, in further embodiments, less than two or more than two joint locations may be utilized. For example, as shown in FIG. 9, the rotor blade 16 may also include non-jointed, continuous blade segments 45. More specifically, as shown, the non-jointed, continuous blade segment 45 does not require bonding of multiple segments. Such segments 45 may be used in combination with and/or exclusive of the additional segments as described herein. Further, as shown in FIG. 10, the rotor blade 16 may also include a single-jointed blade segment 55. More specifically, as shown, the blade segment 55 may include a pressure side surface 33, a suction side surface 31, and a single joint 57 at the trailing edge 42. Thus, the blade segment 55 only requires one joint instead of multiple joints. Such segments 55 may be used in combination with and/or exclusive of the additional segments as described herein. Moreover, as shown in FIG. 11, the rotor blade 16 may also include a multi jointed blade segment 59. More specifically, as shown, the blade segment 59 includes a plurality of segments 41, 43, 47, 49 joined together via multiple joints 61, 63, 65, 67 spaced about the cross-section of the blade segment 59. More specifically, the blade segments 41, 43, 47, 49 may include a forward pressure side segment 43, a forward suction side segment 41, an aft pressure side segment 49, and an aft suction side segment 47. Such segments may be used in combination with and/or exclusive of the additional segments as described herein.

Referring now to FIGS. 2-3 and 6-7, the rotor blade 16 may also include one or more longitudinally extending spar caps configured to provide increased stiffness, buckling resistance and/or strength to the rotor blade 16. For example, the blade root section 20 may include one or more longitudinally extending spar caps 48, 50 configured to be engaged against the opposing inner surfaces of the leading and trailing edge segments 24, 26 of the rotor blade 16. Similarly, the blade tip section 22 may include one or more longitudinally extending spar caps 51, 53 configured to be engaged against the opposing inner surfaces of the leading and trailing edge segments 24, 26 of the rotor blade 16. In addition, blade tip section 20 and/or the blade root section 22 may also include one or more shear webs 35 configured between the one or more spar caps 48, 50, 51, 53 of the blade root section 20 or the blade tip section 22, respectively. As such, the shear web(s) 35 are configured to increase the rigidity in the blade root section 20 and/or the blade tip section 22, thereby allowing the sections 20, 22 to be handled with more control.

More specifically, in particular embodiments, the blade root section 20 and/or the blade tip section 22 may be pre-formed with the one or more spar caps 48, 50, 51, 53. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In further embodiments, as shown in FIGS. 2, 3, and 12-18, the rotor blade 16 may also include a pre-formed, continuous structural component 52 secured to the blade root section 20. Thus, as shown, the structural component 52 is configured to extend in a generally span-wise direction. More specifically, the structural component 52 may extend any suitable distance between the blade root section 20 and the blade tip section 22. As such, the structural component 52 is configured to provide additional structural support for the rotor blade 16 as well as a mounting structure for the various blade segments as described herein. For example, in certain embodiments, the structural component 52 may be secured to the blade root section 20 and may extend a predetermined span-wise distance such that the leading and/or trailing edge segments 24, 26 can be mounted thereto.

In certain embodiments, as shown in FIGS. 12-14 and 17-19, the pre-formed structural component 52 may be secured to a corresponding structural component 58 of the blade root section 20. More specifically, as shown particularly in FIGS. 17 and 18, the structural component 52 may further include a root portion 60 and a body portion 62. As such, in certain embodiments, the root portion 60 may be secured to the corresponding structural component 58 of the blade root section 20, e.g. via a scarf joint, as shown in FIGS. 12 and 13. Thus, in certain embodiments, as shown in FIG. 12, the pre-formed structural component 52 may be an internal feature configured to provide structural support to the modular rotor blade 16. In additional embodiments, as shown in FIG. 13, the pre-formed structural component 52 may be an external feature of the blade root section 20 that forms a flatback cross-sectional shape of the airfoil.

In additional embodiments, the structural component 52 may be constructed of one or more pultruded parts. As used herein, the terms "pultruded parts," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded parts is typically characterized by a continuous process of composite materials that produces composite parts having a constant cross-section. Alternatively, the structural component 52 may be constructed of a core material and one or more skin layers (e.g. a combination of biaxial and unidirectional glass fiber reinforced resin). Thus, in certain embodiments, the structural component 52 may be constructed using a resin infusion process. Further, it should be understood that the structural component 52 may be constructed of any suitable materials. For example, in certain embodiments, the structural component 52 may be constructed of a thermoset polymer, a thermoplastic polymer, or similar.

Accordingly, it should be understood that the structural component 52 may have any suitable cross-sectional shape (that varies or is constant) along a length thereof (e.g. from a root 63 to a tip 65 of the structural component 52). For example, as shown in FIG. 15, the cross-section of the structural component 52 may have a substantially C-shaped configuration. More specifically, as shown, the cross-section may have a flatback portion 64 with a first end 66 and a second end 68. In addition, the first and second ends 66, 68 may each include a flange 70, 72 extending perpendicularly therefrom. As such, the flanges 70, 72 may be configured as suitable mounting structures for the blade segments as described herein. In additional embodiments, the cross-section of the structural component 52 may further include an I-shaped configuration. In further embodiments, as shown in FIGS. 16-18, the corresponding structural component 58 of the blade root section 20 may have a cross-section that varies with a cross-sectional shape of the blade root section 20.

The flanges 70, 72 of the structural component 52 described herein may be constructed using any suitable means. For example, in certain embodiments, the flanges 70, 72 may be pultruded. In additional embodiments, the flanges 70, 72 may be constructed using dry fabric infusion, belt pressing techniques, or similar.

Referring now to FIG. 19, a flow diagram of a method 100 for assembling a modular rotor blade 16 for a wind turbine 10 using the structural component 52 as described herein is illustrated. As shown at 102, the method 100 includes providing a pre-formed blade root section 20 and a pre-formed blade tip section 22 of the rotor blade 16. As shown at 104, the method 100 includes pre-forming a continuous structural component 52 of the rotor blade 16. For example, in one embodiment, the method 100 may include pre-forming the structural component 52 via at least one of pultrusion, vacuum infusion, resin transfer molding (RTM), light resin transfer molding (RTM), vacuum assisted resin transfer molding (VARTM), a forming process (e.g. thermoforming), or similar.

In certain embodiments, the method 100 may also include pre-forming the structural component 52 with one or more pultruded parts. In addition, the method 100 may include pre-forming the structural component 52 such that the component has a predetermined cross-section. For example, as shown in FIG. 15, the predetermined cross-section of the structural component 52 may include a flatback portion 64 having first and second ends 66, 68, with each end including a flange 70, 72 extending perpendicularly therefrom. In addition, as shown, the structural component 52 may be configured at a location of within 50% chord from a trailing edge of the rotor blade 16. As such, the structural component 52 is located closer to the trailing edge 42 than the leading edge 40.

As shown at 106, the method 100 may also include providing one or more pre-formed blade segments. For example, in certain embodiments, the blade segment(s) may be pre-formed using any combination of materials and methods now known or later developed in the art. In addition, it should be understood that the blade segment(s) may include any suitable combination of segments as described herein that form an airfoil. For example, the blade segment(s) may include leading or trailing edge segments 24, 26, pressure or suction side segments 44, 46, a non jointed airfoil segment, a single-jointed blade segment, a multi jointed blade segment, or any combinations thereof.

As shown at 108, the method 100 may also include securing the structural component 52 to the blade root section 20 such that the structural component extends in a generally span-wise direction. For example, in one embodiment, the method 100 may also include securing the pre-formed structural component 52 to a corresponding structural component 58 of the blade root section 20. Further, in particular embodiments, the method 100 may further include securing a root portion 60 of the pre-formed structural component 52 to the corresponding structural component 58 of the blade root section 20 via a scarf joint.

As shown at 110, the method 100 also includes mounting the blade segment(s) to the structural component 52 between the blade root section 20 and the blade tip section 22. More specifically, in certain embodiments, the method 100 may also include mounting the blade segment(s) to the flanges 70, 72 of the structural component 52. For example, in certain embodiments, the method 100 may include mounting pre-formed leading and trailing edge segments 24 to the structural component 52 between the blade root section 20 and the blade tip section. In additional embodiments, the method 100 may further include mounting at least one pressure side segment 44 and at least one suction side segment 46 to the structural component 52 between the blade root section 20 and the blade tip section 22 in a generally span-wise direction.

In further embodiments, the method 100 may also include pre-forming the corresponding structural component 58 of the blade root section 20 so as to have a cross-section that varies with a cross-sectional shape of the blade root section 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A modular rotor blade for a wind turbine, the rotor blade comprising:
    a pre-formed blade root section comprising one or more spar caps extending in a generally span-wise direction, the blade root section comprising a leading edge and a trailing edge;
    a pre-formed blade tip section;
    a continuous, pre-formed structural component secured to and extending at least partially through the blade root section in the span-wise direction, the pre-formed structural component comprising a root portion and a body portion, the body portion of the pre-formed structural component defining a substantially U-shaped cross-section defining a flatback portion and integral opposing flange portions extending from opposite ends of the flatback portion, the pre-formed structural component formed of a thermoplastic material;
    a corresponding structural component secured to the root portion of the pre-formed structural component within the blade root section and aligned with the pre-formed structural component in the span-wise direction, the corresponding structural component extending in the span-wise direction from a root end to a tip end, the corresponding structural component terminating at the root end and the tip end, the root end defining a maximum, first height that tapers to a lesser, second height of the pre-formed structural component, the corresponding structural component of the blade root section located at the trailing edge of the blade root section and following a contour of the trailing edge of the blade root section; and,
    one or more blade segments arranged between the blade root section and the blade tip section, wherein at least one of the one or more blade segments is mounted to the flange portions of the pre-formed structural component.

2. The rotor blade of claim 1, wherein the root portion of the structural component is secured to the corresponding structural component of the blade root section via a scarf joint.

3. The rotor blade of claim 2, wherein the corresponding structural component of the blade root section comprises a cross-section that varies with a cross-sectional shape of the blade root section.

4. The rotor blade of claim 1, wherein the pre-formed structural component is positioned at a location of within 50% chord from a trailing edge of the rotor blade.

5. The rotor blade of claim 1, wherein the pre-formed structural component is constructed of one or more pultruded parts.

6. The rotor blade of claim 1, wherein the pre-formed structural component comprises a constant cross-section along a length thereof.

7. The rotor blade of claim 1, wherein the pre-formed structural component comprises a varying cross-section along a length thereof.

8. The rotor blade of claim 1, wherein the blade tip section comprises one or more spar caps, wherein the blade root section and the blade tip section are joined together via their respective spar caps.

9. A method for assembling a modular rotor blade for a wind turbine, the method comprising:
    providing a pre-formed blade root section and a pre-formed blade tip section of the rotor blade, the blade root section comprising a leading edge and a trailing edge;
    pultruding a continuous structural component for the rotor blade of a thermoplastic material, the pultruded structural component having a root portion and a body portion, the body portion having a substantially U-shaped cross-section comprising a flatback portion and integral opposing flange portions extending from opposite ends of the flatback portion;
    securing a corresponding structural component to the blade root section at the trailing edge thereof, the corresponding structural component following a contour of the trailing edge of the blade root section, the corresponding structural component extending from a root end to a tip end, the corresponding structural component terminating at the root end and the tip end;
    securing the pultruded structural component to the corresponding structural component within the blade root section such that the pultruded structural component and the corresponding structural component extend in a span-wise direction, the root end of the corresponding structural component defining a maximum, first height that tapers to a lesser, second height of the pre-formed structural component; and,
    mounting one or more blade segments to the flange portions of the pultruded structural component between the blade root section and the blade tip section.

10. The method of claim 9, wherein the one or more blade segments comprise at least one of a leading edge segment, a trailing edge segment, a pressure side segment, a suction side segment, a non-jointed, continuous blade segment, a single-jointed blade segment, a forward pressure side segment, a forward suction side segment, an aft pressure side segment, or an aft suction side segment.

11. The method of claim 10, further comprising:
    mounting one or more trailing edge segments to the pultruded structural component between the blade root section and the blade tip section in the generally span-wise direction, and
    securing one or more leading edge segments to the mounted one or more trailing edge segments at a pressure side seam and a suction side seam such that the pultruded structural component is within the one or more leading and trailing edge segments.

12. The method of claim 9, further comprising mounting one or more blade segments to the pultruded structural component between the blade root section and the blade tip section in the generally span-wise direction such that the pultruded structural component is external to the one or more blade segments.

13. The method of claim 9, further comprising securing the root portion of the pultruded structural component to the corresponding structural component of the blade root section via a scarf joint.

14. The method of claim 13, further comprising pre-forming the corresponding structural component of the blade root section so as to have a cross-section that varies with a cross-sectional shape of the blade root section.

* * * * *